(12) United States Patent
Badaan et al.

(10) Patent No.: US 12,184,948 B2
(45) Date of Patent: *Dec. 31, 2024

(54) METHODS AND SYSTEMS FOR TRANSMITTING HIGHLIGHTS OF SPORTING EVENTS TO COMMUNICATION DEVICES

(71) Applicants: Housam Badaan, Kanata (CA); Martin Tremblay, Verdun (CA)

(72) Inventors: Housam Badaan, Kanata (CA); Martin Tremblay, Verdun (CA)

(*) Notice: Subject to any disclaimer, the term of this patent is extended or adjusted under 35 U.S.C. 154(b) by 0 days.

This patent is subject to a terminal disclaimer.

(21) Appl. No.: 18/432,007

(22) Filed: Feb. 4, 2024

(65) Prior Publication Data

US 2024/0179379 A1   May 30, 2024

Related U.S. Application Data

(63) Continuation of application No. 18/159,681, filed on Jan. 25, 2023, now Pat. No. 11,949,963, which is a
(Continued)

(51) Int. Cl.
| | |
|---|---|
| H04N 21/81 | (2011.01) |
| G06Q 30/0251 | (2023.01) |
| H04L 12/18 | (2006.01) |
| H04L 67/55 | (2022.01) |
| H04M 1/72403 | (2021.01) |
| H04N 21/2187 | (2011.01) |
| H04N 21/2668 | (2011.01) |
| H04N 21/41 | (2011.01) |
| H04N 21/458 | (2011.01) |
| H04N 21/488 | (2011.01) |
| H04N 21/8549 | (2011.01) |
| H04W 4/06 | (2009.01) |

(Continued)

(52) U.S. Cl.
CPC ..... *H04N 21/8126* (2013.01); *G06Q 30/0267* (2013.01); *G06Q 30/0269* (2013.01); *H04L 12/1859* (2013.01); *H04L 12/1895* (2013.01); *H04L 67/55* (2022.05); *H04M 1/72403* (2021.01); *H04N 21/2187* (2013.01); *H04N 21/2668* (2013.01); *H04N 21/4126* (2013.01); *H04N 21/458* (2013.01); *H04N 21/4882* (2013.01); *H04N 21/4886* (2013.01); *H04N 21/812* (2013.01); *H04N 21/8549* (2013.01); *H04W 4/06* (2013.01); *H04W 4/12* (2013.01); *H04W 4/60* (2018.02)

(58) Field of Classification Search
CPC .................................................. H04N 21/8126
See application file for complete search history.

(56) References Cited

U.S. PATENT DOCUMENTS

2013/0344959 A1* 12/2013 Relyea .................. A63F 13/213
463/31

* cited by examiner

*Primary Examiner* — Michael H Hong

(57) ABSTRACT

A highlight transmission service allows users of communication devices to view highlights of sporting events while the sporting events are occurring without having to watch the sporting events. For example, a computer-implemented method may comprise: determining that a highlight of a sporting event is to be conveyed to a communication device; and transmitting data regarding the highlight of the sporting event to the communication device over a network during the sporting event in order to allow a user of the communication device to view the highlight of the sporting event.

20 Claims, 15 Drawing Sheets

Related U.S. Application Data continuation of application No. 16/835,269, filed on Mar. 30, 2020, now Pat. No. 11,601,729, which is a continuation of application No. 15/112,457, filed as application No. PCT/CA2015/000037 on Jan. 20, 2015, now Pat. No. 10,631,067.

(60) Provisional application No. 62/017,329, filed on Jun. 26, 2014, provisional application No. 61/929,487, filed on Jan. 20, 2014.

(51) Int. Cl.
*H04W 4/12* (2009.01)
*H04W 4/60* (2018.01)

METHODS AND SYSTEMS FOR TRANSMITTING HIGHLIGHTS OF SPORTING EVENTS TO COMMUNICATION DEVICES

CROSS-REFERENCE TO RELATED APPLICATIONS

This application is a continuation of U.S. patent application Ser. No. 18/159,681 filed on Jan. 25, 2023, which is a continuation of U.S. patent application Ser. No. 16/835,269 filed on Mar. 30, 2020 and issued as U.S. Pat. No. 11,601,729, which is a continuation of U.S. patent application Ser. No. 15/112,457 filed on Jul. 19, 2016 and issued as U.S. Pat. No. 10,631,067, which is a national stage of International Application PCT/CA2015/000037 filed on Jan. 20, 2015, which claims priority from U.S. Provisional Patent Application 61/929,487 filed on Jan. 20, 2014 and U.S. Provisional Patent Application 62/017,329 filed on Jun. 26, 2014, all of which are incorporated by reference herein.

FIELD

The invention relates to transmission of highlights of sporting events, such as football games, hockey games, baseball games, automobile races, tennis matches, etc.

BACKGROUND

Sports fans and others can now watch sporting events, such as hockey games, basketball games, football games, baseball games, soccer games, automobile races, tennis matches, Olympic events, etc., on various devices, including televisions and, most recently, smartphones, tablets and other mobile communication devices.

While this has greatly facilitated watching sporting events, individuals may have to actually watch the sporting events, watch sports news, or access sports websites to view highlights of the sporting events. This may be impractical in many situations. For example, an individual may not have time to watch a sporting event and may only be able to watch highlights of that sporting event much later when he/she watches sports news or accesses a sports website.

For these and other reasons, technology that would facilitate viewing of highlights of sporting events would be welcomed.

SUMMARY

According to an aspect of the invention, there is provided a highlight transmission service allowing users of communication devices to view highlights of sporting events while the sporting events are occurring without having to watch the sporting events.

According to another aspect of the invention, there is provided a computer-implemented method comprising: determining that a highlight of a sporting event is to be conveyed to a communication device; and transmitting data regarding the highlight of the sporting event to the communication device over a network during the sporting event in order to allow a user of the communication device to view the highlight of the sporting event.

According to another aspect of the invention, there is provided a computer-readable storage medium storing computer-readable instructions which, when executed by a computing apparatus, cause the computing apparatus to implement a method comprising: determining that a highlight of a sporting event is to be conveyed to a communication device; and transmitting data regarding the highlight of the sporting event to the communication device over a network during the sporting event in order to allow a user of the communication device to view the highlight of the sporting event.

According to another aspect of the invention, there is provided an apparatus comprising: a processing portion to determine that a highlight of a sporting event is to be conveyed to a communication device; and an output to release a signal for causing transmission of data regarding the highlight of the sporting event to the communication device over a network during the sporting event in order to allow a user of the communication device to view the highlight of the sporting event.

According to another aspect of the invention, there is provided a computer-implemented method comprising: receiving, at a communication device, data regarding a highlight of a sporting event over a network during the sporting event; and processing, at the communication device, the data regarding the highlight of the sporting event to show the highlight of the sporting event to a user of the communication device.

According to another aspect of the invention, there is provided a computer-readable storage medium storing computer-readable instructions which, when executed by a computing apparatus, cause the computing apparatus to implement a method comprising: receiving, at a communication device, data regarding a highlight of a sporting event over a network during the sporting event; and processing, at the communication device, the data regarding the highlight of the sporting event to show the highlight of the sporting event to a user of the communication device.

According to another aspect of the invention, there is provided a communication device comprising: an input to receive data regarding a highlight of a sporting event over a network during the sporting event; and a processing portion to process the data regarding the highlight of the sporting event to show the highlight of the sporting event to a user of the communication device.

These and other aspects of the invention will now become apparent to those of ordinary skill in the art upon review of the following description of embodiments of the invention in conjunction with the accompanying drawings.

BRIEF DESCRIPTION OF THE DRAWINGS

A detailed description of embodiments of the invention is provided below, by way of example only, with reference to the accompanying drawings, in which.

It is to be expressly understood that the description and drawings are only for the purpose of illustrating certain embodiments of the invention and are an aid for understanding. They are not intended to be a definition of the limits of the invention.

DETAILED DESCRIPTION OF EMBODIMENTS

Figure 1:
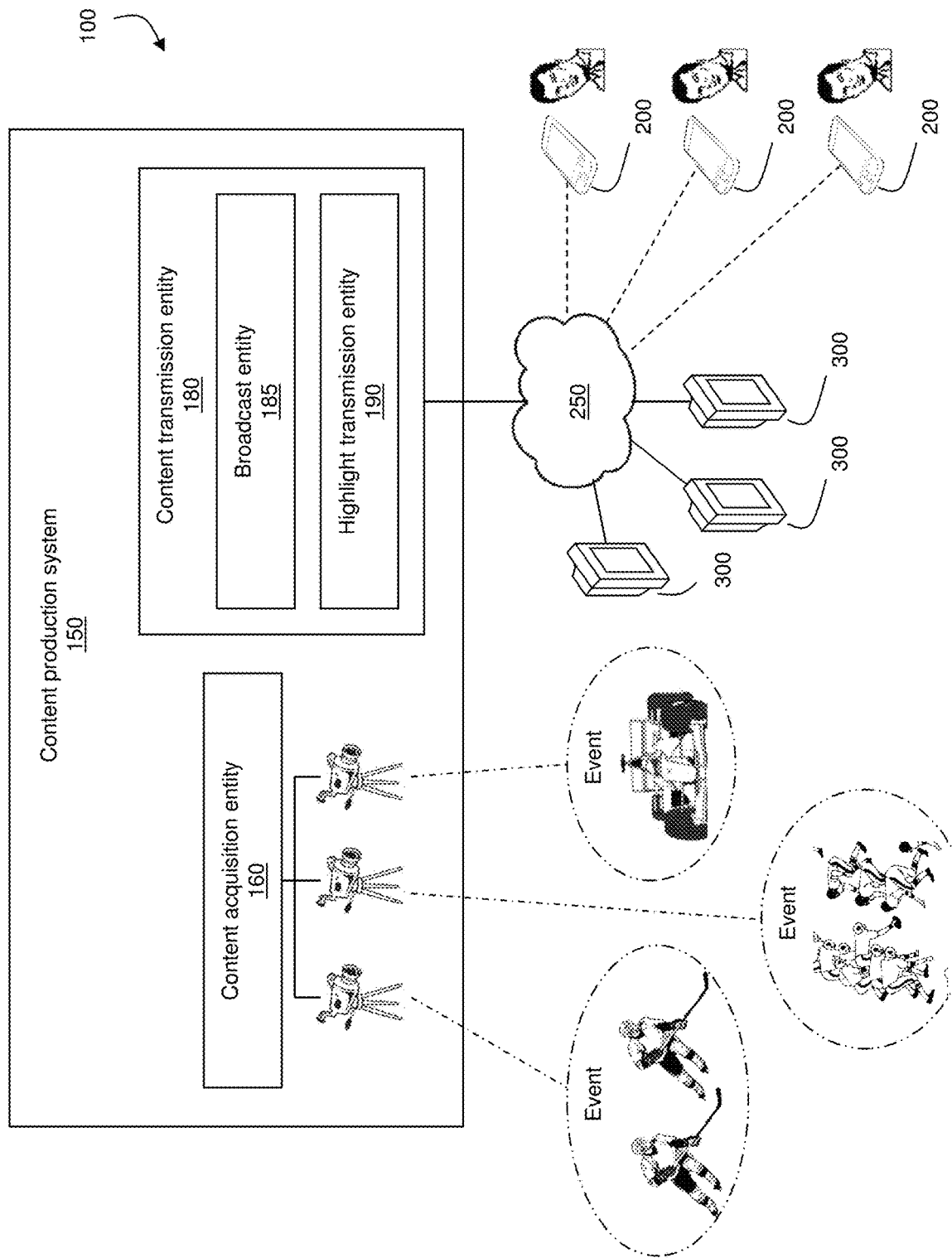
FIG. 1 shows an example of a network architecture for providing a highlight transmission service allowing users of communication devices to view highlights of sporting events while the sporting events are occurring, in accordance with an embodiment of the invention.

FIG. 1 shows an example of a network architecture 100 that can be used to provide a highlight transmission service allowing users of communication devices 200 to view highlights of sporting events while the sporting events are occurring, in accordance with an embodiment of the invention. The sporting events may include hockey games, basketball games, football games, baseball games, soccer games, automobile races, tennis matches, Olympic events, etc.

The communication devices 200 may be implemented in any suitable way. For example, in various embodiments, a communication device 200 may be: a smartphone or other wireless phone; a tablet computer or other personal computer; a smartwatch, head-mounted display (e.g., Google Glass), or other wearable device; a television unit; or any other device capable of effecting communications. Thus, in some embodiments, a communication device 200 may be a mobile communication device (e.g., smartphone, tablet computer, smartwatch, head-mounted display, etc.) to effect communications while being carried by a user.

The network architecture 100 comprises a content production system 150 configured to acquire audio/video (A/V) content from the sporting events and transmit the A/V content to various devices, including televisions 300 and the communication devices 200, over a network 250. The network 250 may be implemented by one or more of a data network (e.g., the Internet), a wireless network (e.g., a cellular network, a satellite network link, etc.), a public telephony network (e.g., the PSTN), a television network, and any other telecommunications network. For example, in some embodiments, the content production system 150 may be implemented by or have access to one or more sports television networks such as NBC Sports, ABC Sports, CBS Sports, Fox Sports, ESPN, The Sports Network (TSN), etc.

The content production system 150 comprises suitable hardware and/or software for implementing a plurality of functional entities, including a content acquisition entity 160 and a content transmission entity 180.

The content acquisition entity 160 is configured to acquire the A/V content from the sporting events. More particularly, the content acquisition entity 160 is configured to acquire the A/V content from the sporting events that is derived from A/V capturing equipment (e.g., cameras, microphones, etc.) at the sporting events. For example, a source of content for the content acquisition entity 160 may comprise a direct wired and/or wireless link to the A/V capturing equipment at the sporting events, an antenna receiving radio broadcast content (e.g., on national broadcast channels), a cable (e.g., fiber-optic or coaxial) conveying broadcast content (e.g., on specialty channels), or a satellite dish receiving content conveyed by a satellite signal. In addition, the content acquisition entity 160 may be configured to process (e.g., encode and/or store) the A/V content. The content acquisition entity 160 may comprise one or more servers and encoders (e.g., for MPEG compression) to acquire the content and put it in a format for distribution to viewers.

The content transmission entity 180 is configured to transmit data relating to the A/V content from the sporting events, including data conveying the A/V content itself, to devices, including the televisions 300 and the communication devices 200, over the network 250. For instance, the content transmission entity 180 may comprise one or more servers for processing and/or storing data relating to the A/V content from the sporting events and/or one or more routers or switches and/or other communication equipment to transmit that data.

To that end, in this embodiment, the content transmission entity 180 comprises a broadcast entity 185 for transmitting data conveying the A/V content to the televisions 300 such that a viewer of a television 300 can watch an entirety of a sporting event (e.g., watch a "live" televised broadcast of the sporting event) by tuning in to a specific channel on the television 300.

Furthermore, in this embodiment, the content transmission entity 180 comprises a highlight transmission entity 190 for transmitting data regarding highlights of the sporting events to the communication devices 200. A highlight of a sporting event is an occurrence in the sporting event that is of major significance or special interest, such as: a goal, touchdown, field goal, run or other scoring play; a missed scoring opportunity; a spectacular play; a fight; a penalty; an injury; an accident, etc. Data regarding the highlight of the sporting event, which may include data conveying A/V content presenting the highlight of the sporting event, is transmitted to a communication device 200 soon after occurrence of the highlight, i.e., transmitted to the communication device 200 during the sporting event shortly after (e.g., within a few seconds or minutes from) the highlight having occurred. Users of the communication devices 200 can thus view highlights from the sporting events shortly after they occur without having to watch the sporting events in their entirety.

Figure 2:
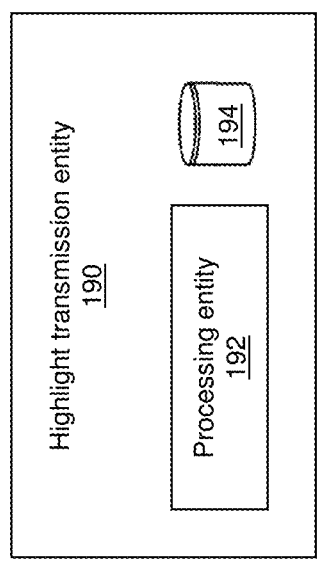
FIG. 2 shows an example of a highlight transmission entity.

With additional reference to FIG. 2, in this embodiment, the highlight transmission entity 190 comprises a processing entity 192 and a database 194. The database 194 includes information used to transmit data regarding highlights of the sporting events to the communication devices 200. The processing entity 192 performs processing operations, including accessing the information contained in the database 194, to implement functionality of the highlight transmission entity 190.

Figure 3:
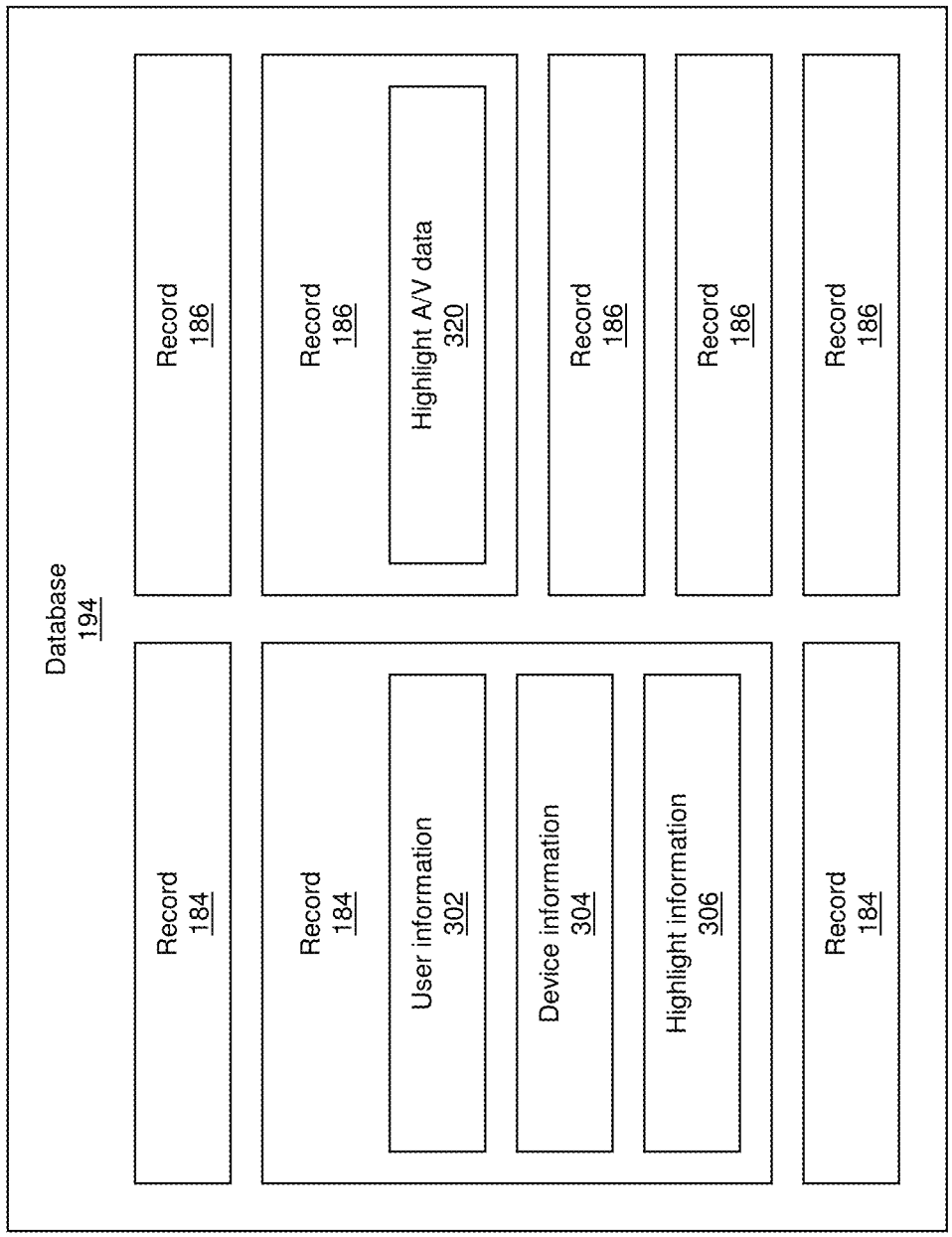
FIG. 3 shows an example of contents of a database of the highlight transmission entity.

More particularly, in this embodiment, as shown in FIG. 3, the database 194 includes records 184 associated with different communication devices 200 to which data regarding highlights of the sporting events may be transmitted. In this example, each record 184 includes information regarding a user, a communication device 200, and highlights of the sporting events to be conveyed to the communication device 200 for viewing by the user, which may include:

- user information 302 regarding the user, which may include: identification information and credentials for the user (a name or another identifier, a password, etc.); contact information (e.g., a phone number, a geographical address, an email address, etc.) to reach the user; etc.;
- device information 304 regarding the communication device 200, which may include a network identifier (directly or indirectly) identifying the communication device 200, such as a telephone number, an electronic serial number (ESN), an Internet Protocol (IP) address, another Uniform Resource Identifier (URI) such as a Session Initiation Protocol (SIP) URI, etc.; and
- highlight information 306 regarding highlights to be conveyed to the communication device 200, which may include an indication of one or more types of highlight to be conveyed to the communication device 200 (e.g., a goal, touchdown, run, or other scoring play, a spectacular play, a fight, an accident, etc.), which may be: for one or more specified sporting events (e.g., one or more specific hockey, basketball, football or baseball games, one or more specific races, etc.) occurring on one or more specified dates; for any sporting event on any date involving a specified team or player (e.g., a specific hockey, basketball, football, or baseball team, a specific player on a team, a specific tennis player, etc.); and/or for one or more specified players or other specified participants in sporting events on any date.

The records 184 may be created by users of the communication devices 200 who may interact with the highlight transmission entity 190. For example, in some embodiments, a user may use a communication device 200 connected to the Internet to visit a website associated with the highlight transmission entity 190. A server implementing the website may interact with the user via the communication device 200 to solicit information from the user, including some or all of the user information 302, the device information 304, and the highlight information 306 to be included in a record 184 for the highlight transmission service. As another example, for instance where the communication device 200 is a smartphone, tablet or other mobile device, the user may download an application (app) from a repository (e.g., Apple's App Store, Google Play, etc.) onto the smartphone, tablet or other mobile device 200. Upon activation of the app on the smartphone, tablet or other mobile device 200, the user may access certain features of the highlight transmission service locally on the smartphone, tablet or other mobile device 200. In addition, a data connection can be established over the Internet with a server of the highlight transmission entity 190, which executes a complementary server-side application interacting with the app on the smartphone, tablet or other mobile device 200.

In addition, in this embodiment, the database 194 includes records 186 associated with different highlights which have occurred in the sporting events. In this example, each record 186 includes data 320 conveying A/V content presenting a highlight of a sporting event (i.e., video and sound of the highlight). This data 320, which will be referred to as "highlight A/V data", may have any suitable form. For instance, in some embodiments, the highlight A/V data 320 may be in an MPEG format, another video compression format, or any other suitable format, and/or may be stored in a file or any other suitable recording. A size of the highlight A/V data 320 depends on a duration of the highlight of the sporting event. For example, in some embodiments, the duration of the highlight of the sporting event may be no more than two minutes, in some cases no more than one minute, in some cases no more than forty-five seconds, in some cases no more than thirty seconds, in some cases no more than fifteen seconds, and in some cases even shorter.

The records 186 are created upon occurrence of the highlights during the sporting events based on the A/V content of the highlights obtained from the content acquisition entity 160. For example, in some embodiments, upon occurrence of a highlight during a sporting event, the A/V content of the highlight acquired by the content acquisition entity 160 may be tagged or otherwise identified (e.g., using metadata) as being of major significance or special interest and/or categorized as a particular type of occurrence amongst different types of occurrences (e.g., a "scoring play" type, a "spectacular play" type, an "injury" type, an "accident" type, etc.). In some cases, this may be done by one or more individuals (e.g., producers or other employees) working for a company or other organization operating some or all of the content production system 150 who interact with computers or other devices of the content production system 150 to identify and/or categorize the A/V content of the highlights. In other cases, this may be done automatically by the processing entity 192 which may apply image and/or sound processing to detect occurrence of the highlights in the sporting events and identify and/or categorize the A/V content of the highlights. For instance, in some examples, the A/V content of the highlights may be A/V content of "instant replays" of the highlights obtained from the content acquisition entity 160. Also, in some examples, metadata (i.e., descriptive data) about the A/V content of the highlights in the records 186 may include, for instance: an identification of a sport (e.g., hockey, baseball, football, etc.) in which a highlight occurred; information about a game (e.g., teams, date, time, etc.) during which the highlight occurred; a type of occurrence (e.g., a "scoring play" type, a "spectacular play" type, an "injury" type, an "accident" type, etc.); an indication of a team who generated the highlight; an identification of one or more players involved in the highlight (e.g., by name, number, etc.); a name and/or a path to a file containing the A/V content of the highlight; and/or any other suitable information.

Figure 4:
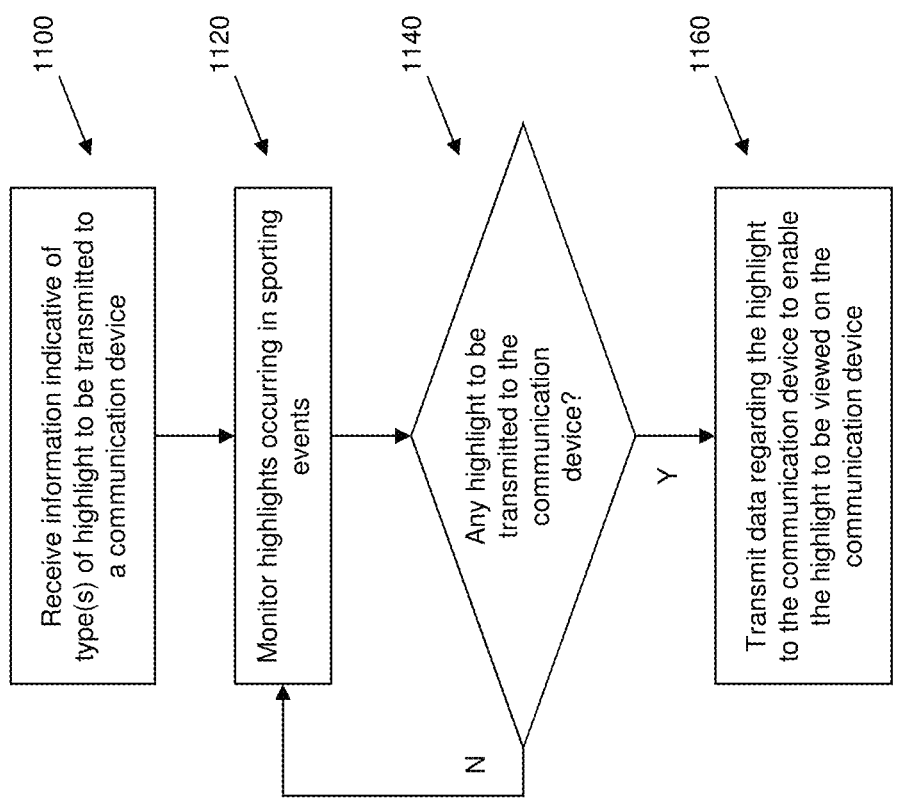
FIG. 4 shows an example of a flowchart representing steps of a process executed by the highlight transmission entity.
Figure 5:
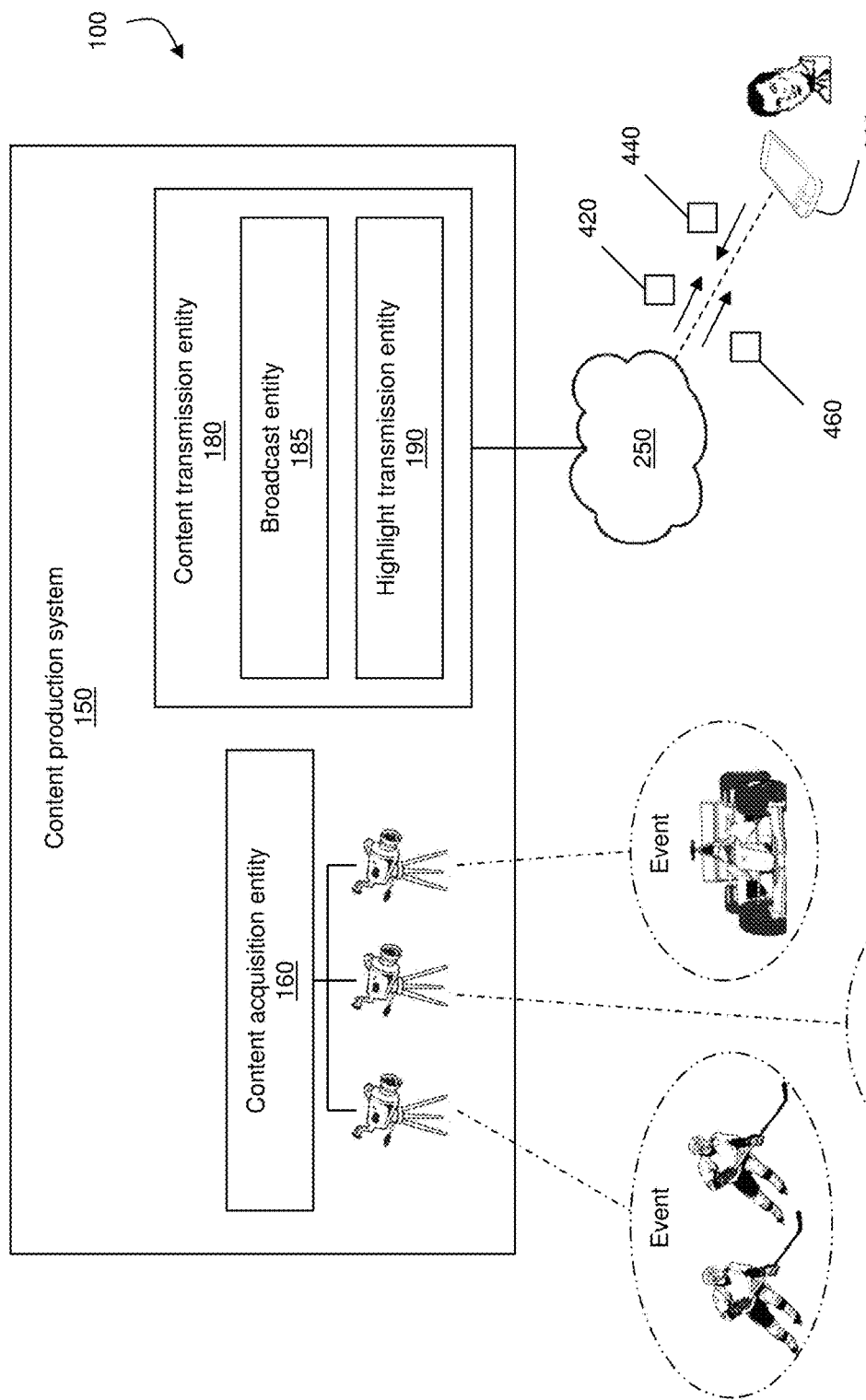
FIG. 5 shows an example of data transmitted by the highlight transmission entity to enable a communication device to show a highlight of a sporting event.

An example of a process by which a user of a communication device 200 may use the highlight transmission service in this embodiment will now be discussed with additional reference to FIGS. 4 and 5.

In this example, at step 1100, the user interacts with the highlight transmission entity 190 in order to specify information indicative of one or more types of highlight that the user desires to be conveyed to the communication device 200. For purposes of this example, it is assumed that the user desires highlights from a plurality of different sports (e.g., hockey, football, baseball, etc.) to be conveyed to the communication device 200. More particularly, for purposes of this example, it is assumed that the user specifies that (1) any goal scored by a particular hockey team, say "Team ABC" of the National Hockey League (NHL), in upcoming games of Team ABC and (2) any touchdown or field goal scored in specific upcoming football games, say playoff games, of the National Football League (NFL) are to be conveyed to the communication device 200. The user may also provide information about themselves (e.g., name, password, telephone number, email address, etc.). Information about the communication device 200 (e.g., a network identifier, etc.) may also be provided by the user and/or obtained directly from the communication device 200. For instance, in various embodiments, as mentioned above, this may be achieved by the user using the communication device 200 to interact with a website implemented by the highlight transmission entity 190 and/or by the user using an app downloaded onto the communication device 200 to interact with a server-side application executed by the highlight transmission entity 190. Based on input from the user and interaction with the communication device 200, the highlight transmission entity 190 includes the user information 302, the device information 304, and the highlight information 306 in a record 184 of the database 194.

As the sporting events unfold, in this example, at steps 1120 and 1140, the highlight transmission entity 190 monitors highlights occurring in the sporting events and determines whether any highlight occurring in the sporting events is to be conveyed to the communication device 200. More particularly, in this embodiment, as records 186 for different highlights which have occurred in the sporting events are created in the database 194, the processing entity 192 processes these records to determine whether any of these highlights is to be conveyed to the communication device 200. Specifically, the processing entity 192 determines whether any highlight corresponds to what is specified by the highlight information 306 in the record 184 for the communication device 200. Thus, in this example, the processing entity 192 determines whether any highlight is a goal scored by Team ABC in the NHL or any touchdown or field goal scored in a playoff game of the NFL.

For purposes of this example, it is assumed that a highlight which has just occurred is a goal scored by Team ABC in the NHL. The highlight transmission entity 190 thus determines that this highlight, which will be referred to as "Team ABC's goal", is to be conveyed to the communication device 200. Accordingly, in this example, at step 1160, the highlight transmission entity 190 proceeds to transmit data 420 regarding Team ABC's goal to the communication device 200 via the network 250 in order to enable the user to view Team ABC's goal on the communication device 200.

Figure 14:
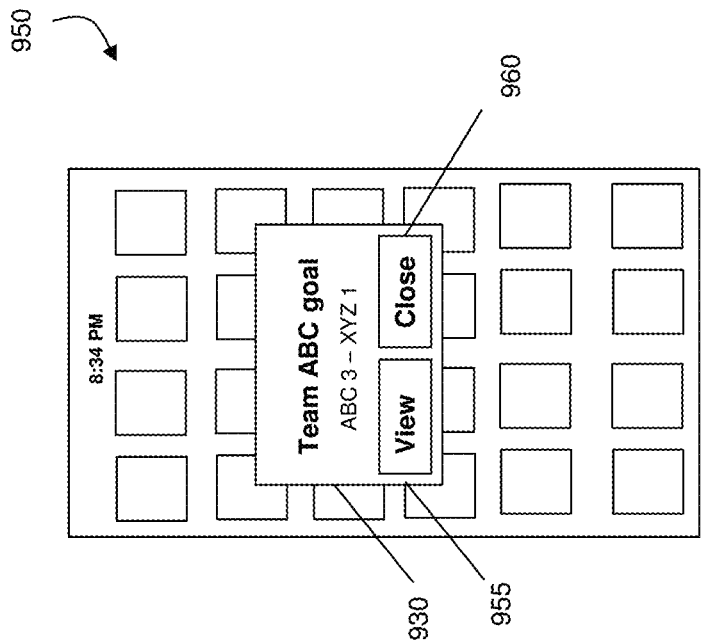

In this embodiment, the data 420 regarding Team ABC's goal may convey a notification notifying the user of Team ABC's goal and actionable by the user to view Team ABC's goal. For example, the data 420 may be transmitted as a Short Message Service (SMS), Multimedia Message Service (MMS) or other text message or an email message including a hyperlink or another graphical element that is selectable by the user to view Team ABC's goal. As another example, the data 420 may cause an app running on the communication device 200 to provide the notification as a "push notification" (e.g., a "pop-up" window or message) with a button, hyperlink, or other graphical element that can be acted upon by the user to view Team ABC's goal. For instance, FIG. 14 shows an example of a push notification 930 that may be displayed on a screen 950 of the communication device 200 by the app running thereon in response to the data 420. The push notification 930 alerts the user about Team ABC's goal and includes an actionable graphical element 955 (e.g., a button) that the user can select to view Team ABC's goal. The push notification 930 also includes another graphical element 960 that the user can select to not view Team ABC's goal right away.

The data 420 regarding Team ABC's goal is transmitted to the communication device 200 during Team ABC's game shortly after Team ABC's goal. For example, in some embodiments, the data 420 regarding Team ABC's goal may be transmitted to the communication device 200 within fifteen minutes from Team ABC's goal, in some cases within ten minutes from Team ABC's goal, in some cases within five minutes from Team ABC's goal, in some cases within three minutes from Team ABC's goal, in some cases within two minutes from Team ABC's goal, in some cases within one minute from Team ABC's goal, in some cases within forty-five seconds from Team ABC's goal, in some cases within thirty seconds from Team ABC's goal, and in some cases even faster.

Upon the user acting on the notification conveyed by the data 420 to indicate that the user desires to view Team ABC's goal, the communication device 200 transmits data 440 conveying a request to view Team ABC's goal to the highlight transmission entity 190. In response, the highlight transmission entity 190 transmits data 460 conveying A/V content of Team ABC's goal to the communication device 200. The data 460 corresponds to the data 320 in the record 186 for Team ABC's goal in the database 194.

Figure 15:
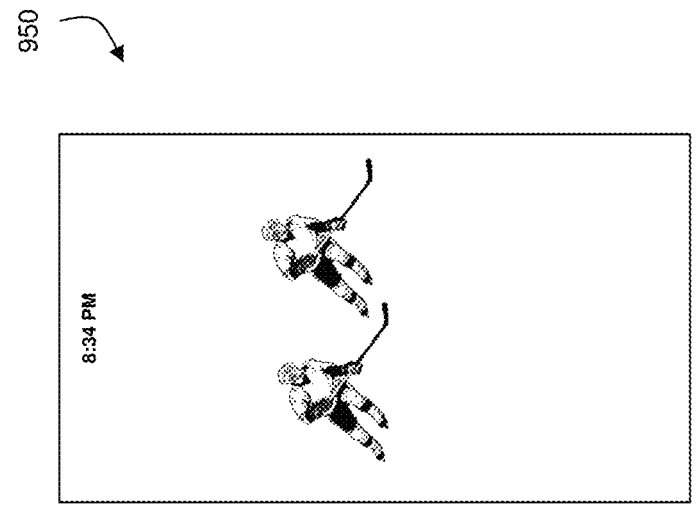
FIGS. 14 and 15 shows examples of manifestations of a graphical user interface (GUI) on a screen of the communication device.

When the communication device 200 receives the data 460 conveying the A/V content of Team ABC's goal, the communication device 200 processes it to show Team ABC's goal to the user. For example, FIG. 15 shows an example of the A/V content of Team ABC's goal being presented on the screen 950 of the communication device 200 in response to the data 460 by the app running on the communication device 200. Accordingly, the user can view Team ABC's goal shortly after it occurred without having to watch Team ABC's game in its entirety. Also, in this case, the user can do this in a single step (i.e., by clicking or otherwise acting upon the notification presented to him/her on the communication device 200), without having to use any other application or website.

The highlight transmission service contemplated herein may be implemented in various other ways in other embodiments.

Figure 6:
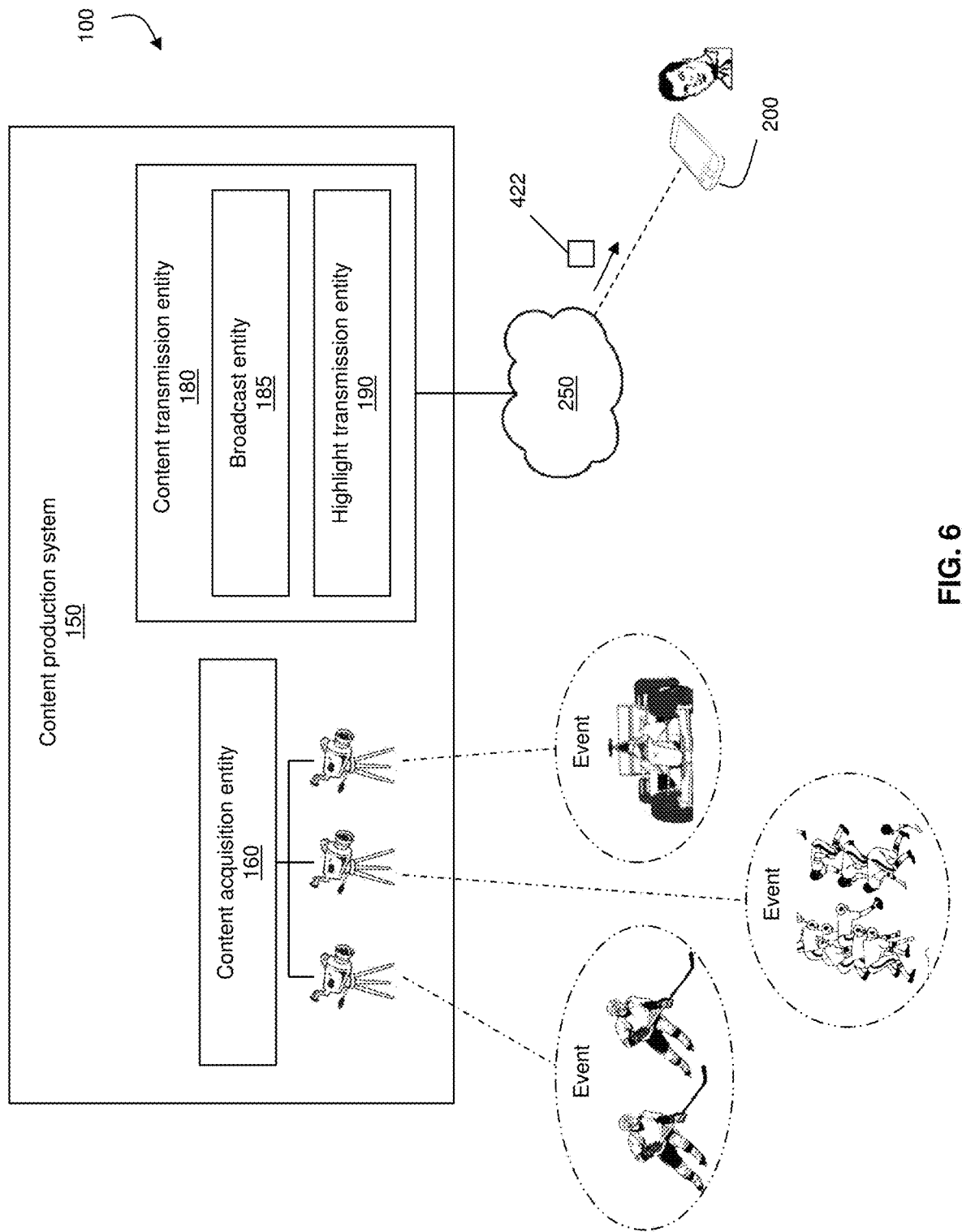
FIGS. 6 and 7 show examples of variants of data transmitted by the highlight transmission entity to a communication device to show a highlight of a sporting event.

For example, in other embodiments, upon occurrence of highlights in the sporting events, the highlight transmission entity 190 may transmit (1) notifications notifying users of the highlights and actionable by the users to view the highlights and (2) A/V content of the highlights to the communication devices 200 in a single step. For instance, in the example considered above, as shown in FIG. 6, the highlight transmission entity 190 may transmit data 422 conveying both (1) a notification notifying the user of Team ABC's goal and actionable by the user to view Team ABC's goal and (2) the A/V content of Team ABC's goal to the communication device 200 in a single transmission. For example, the data 422 may be transmitted as a text message or email message including (1) an indication that it relates to Team ABC's goal and (2) a file (e.g., an MPEG file) that conveys the A/V content of Team ABC's goal and that is openable by the user to view Team ABC's goal. The file is created based on the data 320 in the record 186 for Team ABC's goal in the database 194. The indication that the text message or email message relates to Team ABC's goal may be a name of the file or may be separate from the file. As another example, the data 422 may include a file conveying the A/V content of Team ABC's goal and cause an app running on the communication device 200 to provide a push notification (e.g., a "pop-up" window or message) with a button or other graphical element that can be acted upon by the user to open the file in order to view Team ABC's goal.

Figure 7:
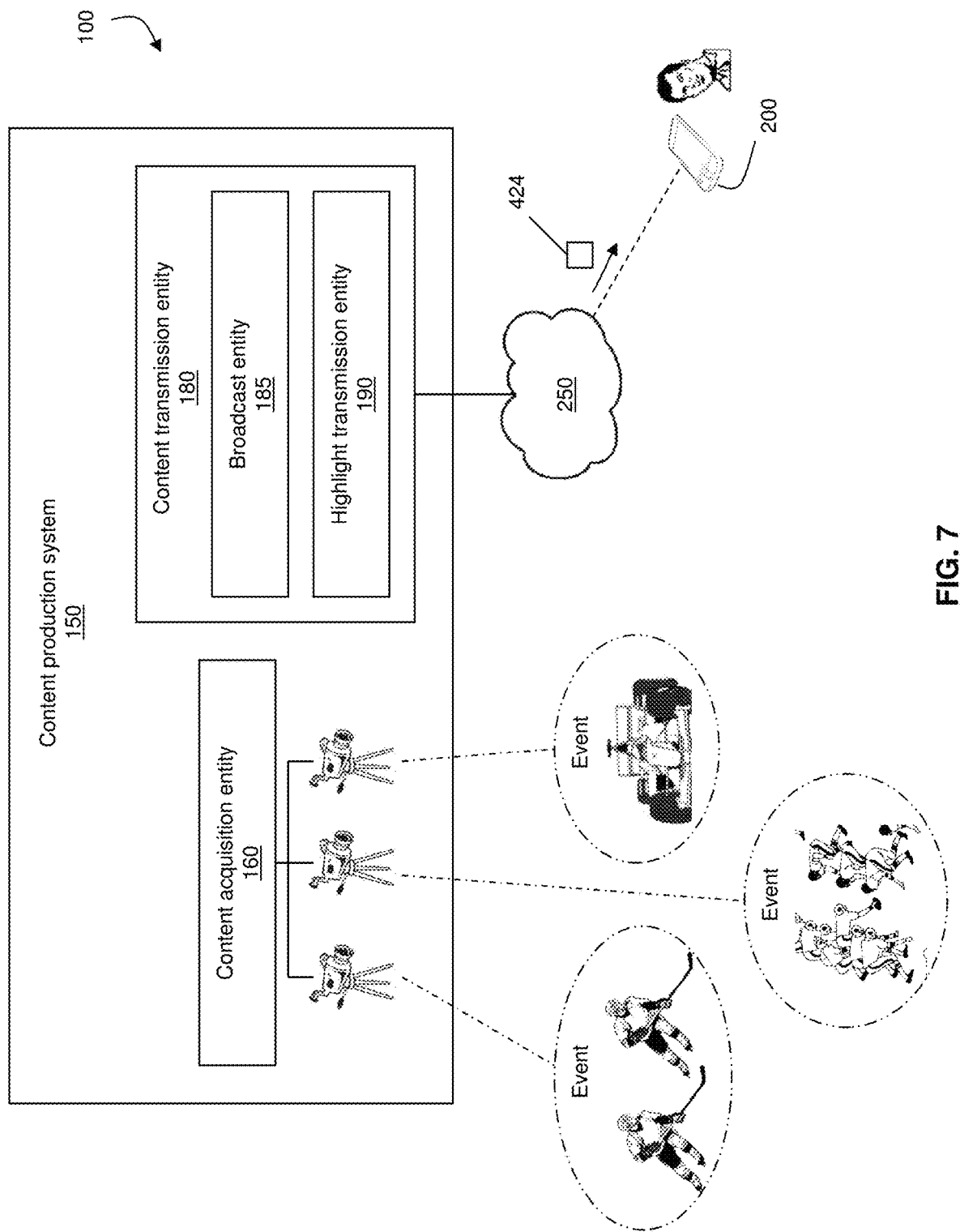

In other embodiments, upon occurrence of highlights in the sporting events, the highlight transmission entity 190 may convey A/V content of the highlights to the communication devices 200 such that the highlights are shown on the communication devices 200 without users of the communication devices 200 requesting to see the highlights after they have occurred. For instance, in the example considered above, as shown in FIG. 7, data 424 pertaining to Team ABC's goal may be transmitted by the highlight transmission entity 190 and convey the A/V content of Team ABC's goal such that Team ABC's goal is shown on the communication device 200 without the user requesting to see it after it has occurred. In that case, the data 424 corresponds to the data 320 in the record 186 for Team ABC's goal in the database 194. Thus, in this variant, the data 420, which conveys a notification notifying the user of Team ABC's goal and actionable by the user to view Team ABC's goal, and the data 440, which conveys a request to view Team ABC's goal, are not transmitted by the highlight transmission entity 190 and the communication device 200 since the data 424 causes Team ABC's goal to be directly shown on the communication device 200 without input from the user.

Figure 8:
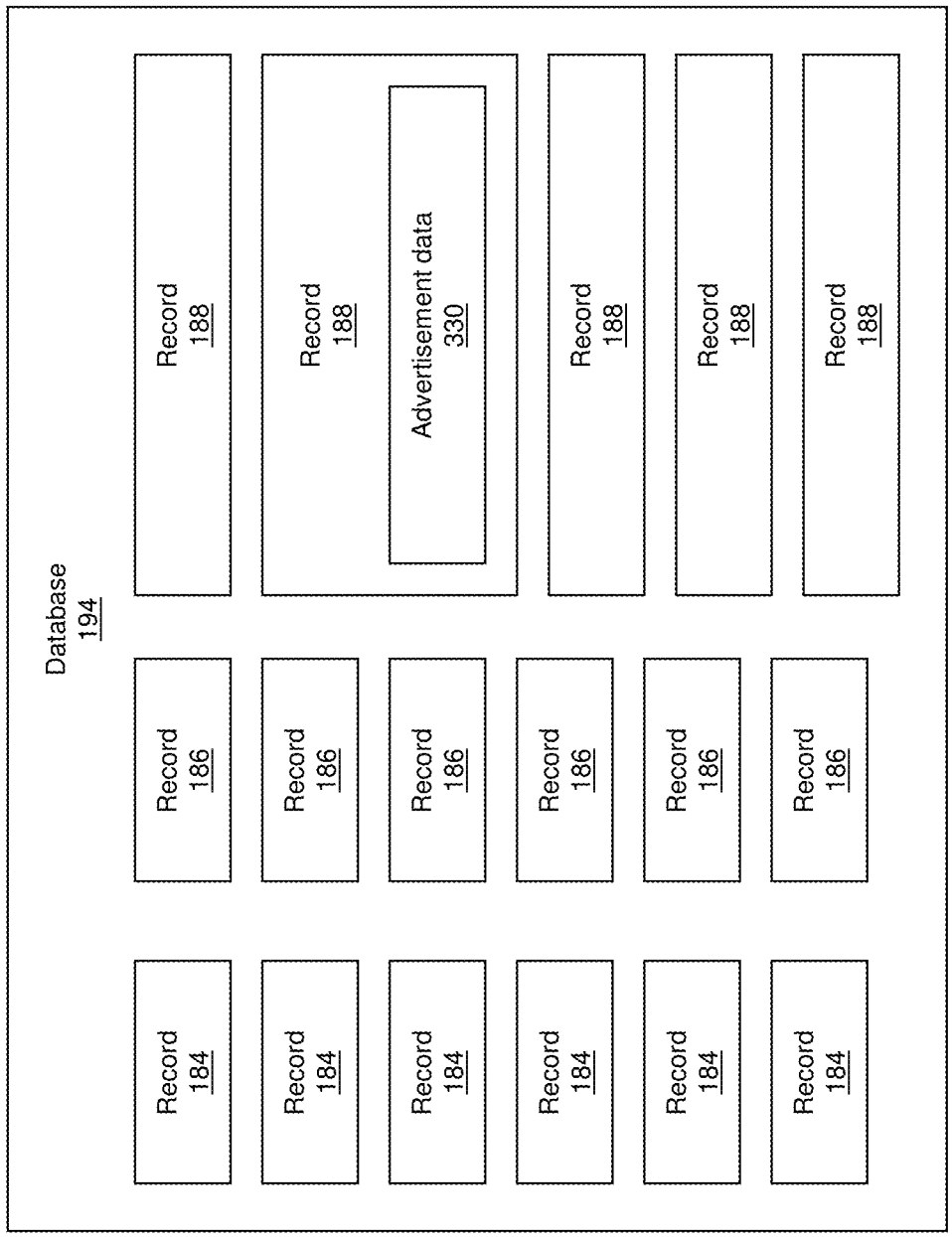
FIGS. 8 and 9 show an example of a variant in which an advertisement is transmitted by the highlight transmission entity in association with a highlight of a sporting event.
Figure 9:
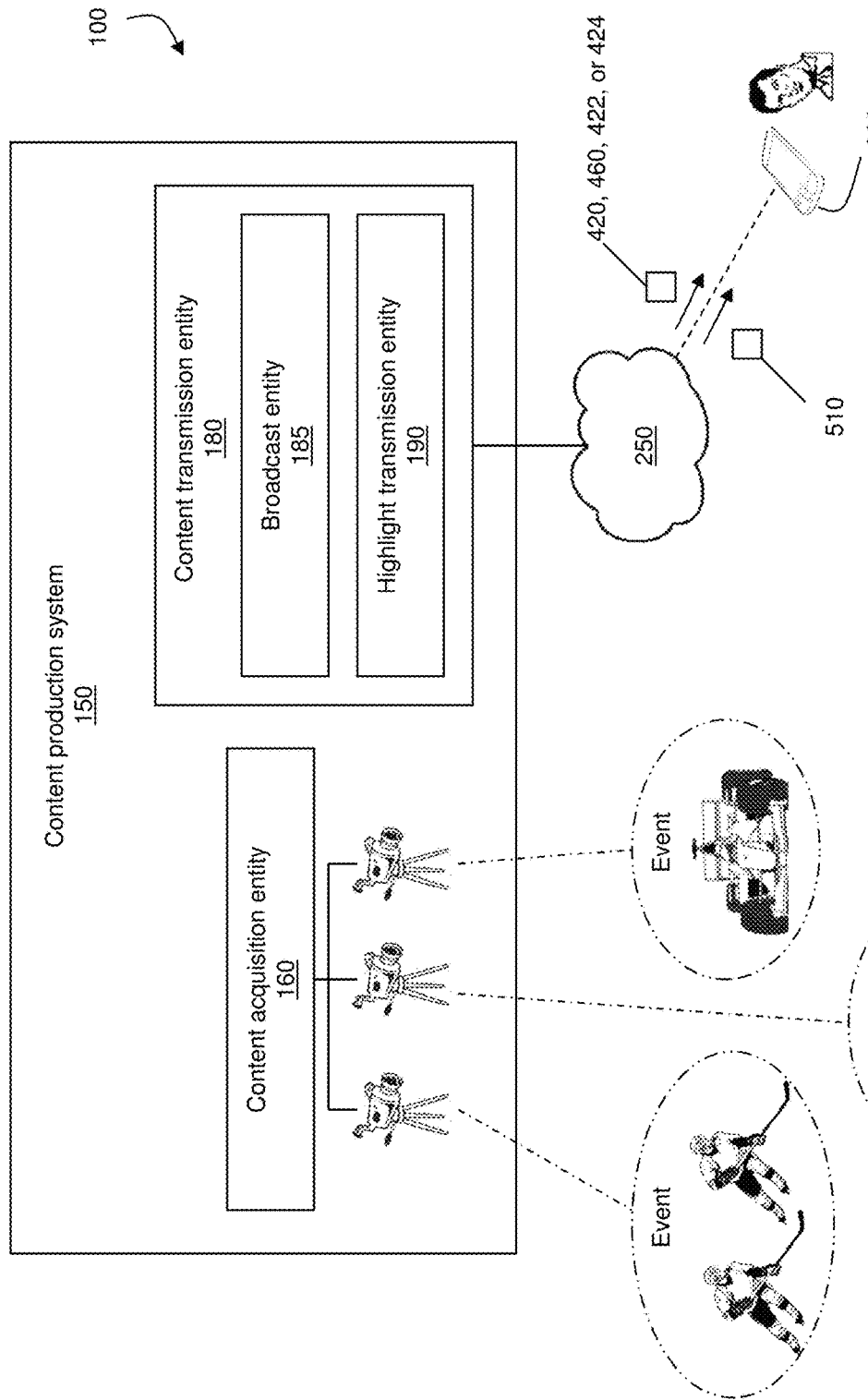

In some embodiments, advertisements (e.g., for products, services, companies or other organizations, TV programs, movies, etc.) may be presented on communication devices 200 in association with highlights of the sporting events. The adverstisements may include banner ads, pop-up ads, video ads, or any other static or rich media display ads or other types of ads. To that end, as shown in FIG. 8, the database 194 of the highlight transmission entity 190 may contain records 188 including data 330 regarding the advertisements, which will be referred to as "advertisement data". For instance, in the example considered above, as shown in FIG. 9, the highlight transmission entity 190 may transmit data 510 conveying an advertisement to the communication device 200. The data 510 corresponds to the advertisement data 330 included in a record 188 of the database 194. The advertisement may be selected based on: a characteristic of the user (e.g., his/her age, location, etc.) such as based on the user information 302 in the record 184 of the database 194; one or more types of highlight to be conveyed to the communication device 200 such as based on the highlight information 306 in the record 184 of the database 194; Team ABC's goal (i.e., the highlight itself); and/or any other suitable factor. In some cases, the data 510 may be transmitted such that the advertisement is presented on the communication device 200 before Team ABC's goal is shown to the user (i.e., Team ABC's goal is shown only after the advertisement has been shown). In other cases, the data 510 may be transmitted such that the advertisement is presented on the communication device 200 concurrently while Team's ABC's goal is shown to the user. In yet other cases, the data 510 may be transmitted such that the advertisement is presented on the communication device 200 after Team ABC's goal is shown to the user.

Figure 10:
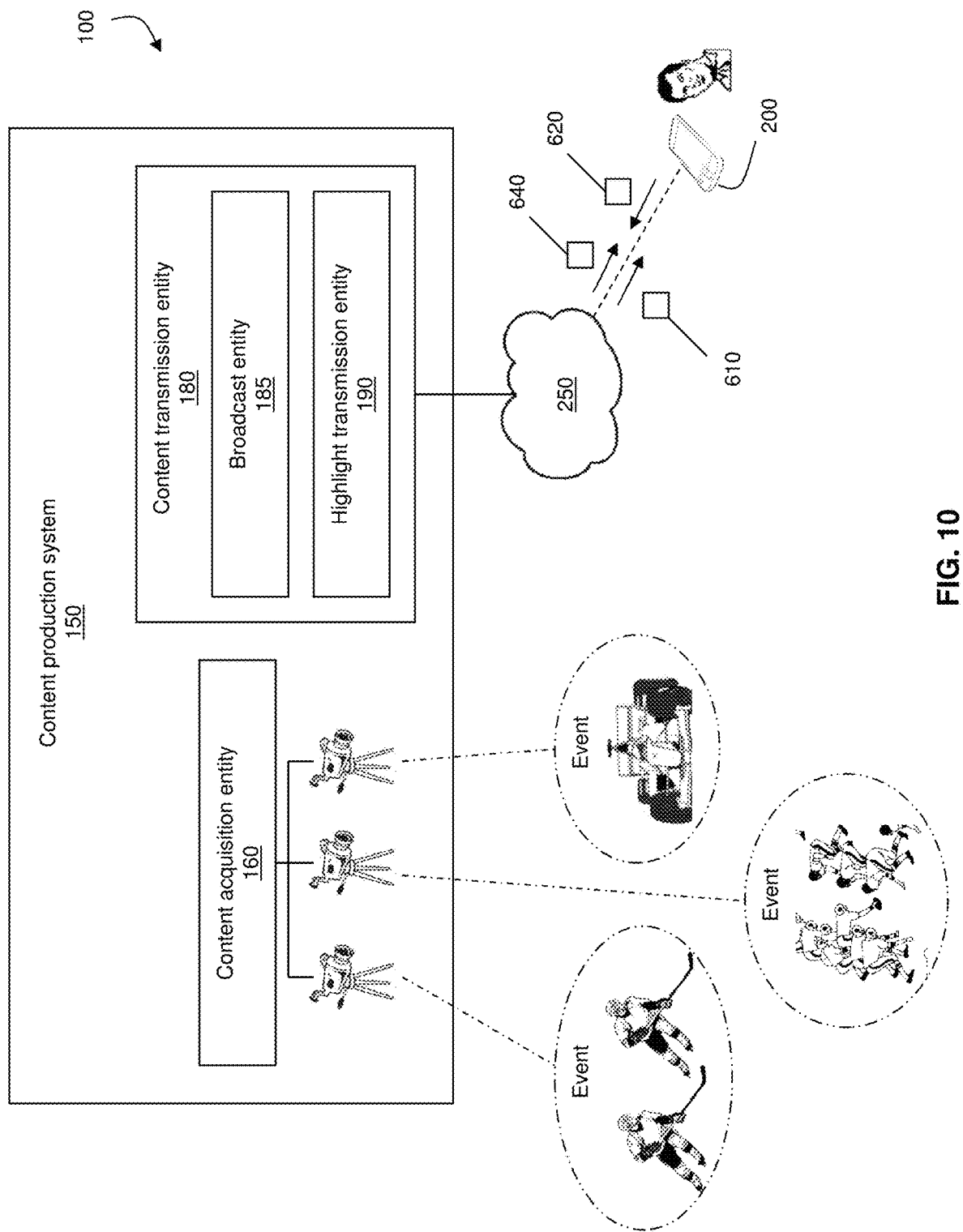
FIG. 10 shows an example of a variant in which a prolonged period of a sporting event can be watched on a communication device after presentation of a highlight of the sporting event on the communication device.

In some embodiments, upon occurrence of highlights in the sporting events, the highlight transmission entity 190 may allow users of the communication devices 200 to watch prolonged periods (e.g., remainders) of the sporting events after the highlights occurred. For instance, in the example considered above, as shown in FIG. 10, the highlight transmission entity 190 may transmit data 610 conveying an invitation for the user to watch a prolonged period, say a remainder, of Team ABC's current game after Team ABC's goal has occurred to the communication device 200. The invitation is actionable by the user (e.g., includes a hyperlink, button, or other graphical element that the user can act on) to watch the remainder of Team ABC's current game on the communication device 200. The data 610 may be conveyed together with the data 420, 460, 422, or 424 relating to Team ABC's goal in a common transmission or may be conveyed separately from the data 420, 460, 422, or 424 relating to Team ABC's goal in a separate transmission right after transmission of the data 420, 460, 422, or 424 relating to Team ABC's goal.

For example, the data 610 may be transmitted as a text message or email message that invites the user to watch the remainder of Team ABC's current game and includes a hyperlink, a button, or another graphical element that can be acted upon by the user to express his/her desire to watch the remainder of Team ABC's current game. As another example, the data 610 may cause an app running on the communication device 200 to provide a push notification (e.g., a "pop-up" window or message) that invites the user to watch the remainder of Team ABC's current game and includes a button or other graphical element that can be acted upon by the user to express his/her desire to watch the remainder of Team ABC's current game.

For purposes of this example, it is assumed that the user desires to watch the remainder of Team ABC's current game and thus acts on the invitation conveyed by the data 610 (e.g., by acting on a hyperlink, button or other graphical element presented on the communication device 200). This causes the communication device 200 to transmit data 620 conveying a request to watch the remainder of Team ABC's current game to the highlight transmission entity 190.

In response, the highlight transmission entity 190 transmits data 640 conveying A/V content of the remainder of Team ABC's current game to the communication device 200 to allow the user to watch the remainder of Team ABC's current game. The data 640 may be conveyed as a media stream of the remainder of Team ABC's current game to the communication device 200. For instance, the media stream may mirror what is being broadcast by the broadcast entity 185.

As it receives the data 640 conveying the A/V content of the remainder of Team ABC's current game, the communication device 200 processes the data 640 to show the remainder of Team ABC's current game to the user. Therefore, upon having viewed Team ABC's goal, the user can start watching the remainder of Team ABC's current game (i.e., presentation of Team ABC's goal served as a "trigger" for the user to watch the remainder of Team ABC's current game).

In some cases, this ability for the user to watch the remainder of Team ABC's current game after Team ABC's goal has occurred may be available to the user by default and/or free of charge. In other cases, this ability for the user to watch the remainder of Team ABC's current game after Team ABC's goal has occurred may incur a charge for the user (i.e., the user may purchase that presentation of the remainder of Team ABC's current game). For example, when the user decides to watch the remainder of Team ABC's current game and acts on the invitation conveyed by the data 610 (e.g., by acting on a hyperlink, button or other graphical element presented on the communication device 200), a charge (e.g., 99 cents or any other suitable monetary amount) may be made to an account associated with the user of the communication device 200. For instance, the user information 302 in the record 184 of the database 194 may include a financial account number (e.g., a credit card number, a bank account number, a debit card number, etc.) associated with the user of the communication device 200. Payment of the charge for watching the remainder of Team ABC's current game may thus be made using this financial account number. Alternatively, an invoice may be issued to the user based on the geographical address, email address or other contact information in the user information 302 contained in the record 184 of the database 194.

In some embodiments, upon occurrence of highlights in the sporting events, the highlight transmission entity 190 may allow users of the communication devices 200 to obtain factual information related to the sporting events. For instance, the factual information related to the sporting events may include stats (i.e., statistics) related to the sporting events (e.g., player stats of players who scored or were otherwise involved in the highlights, team stats of teams who scored or were otherwise involved in the highlights, etc.).

Figure 11:
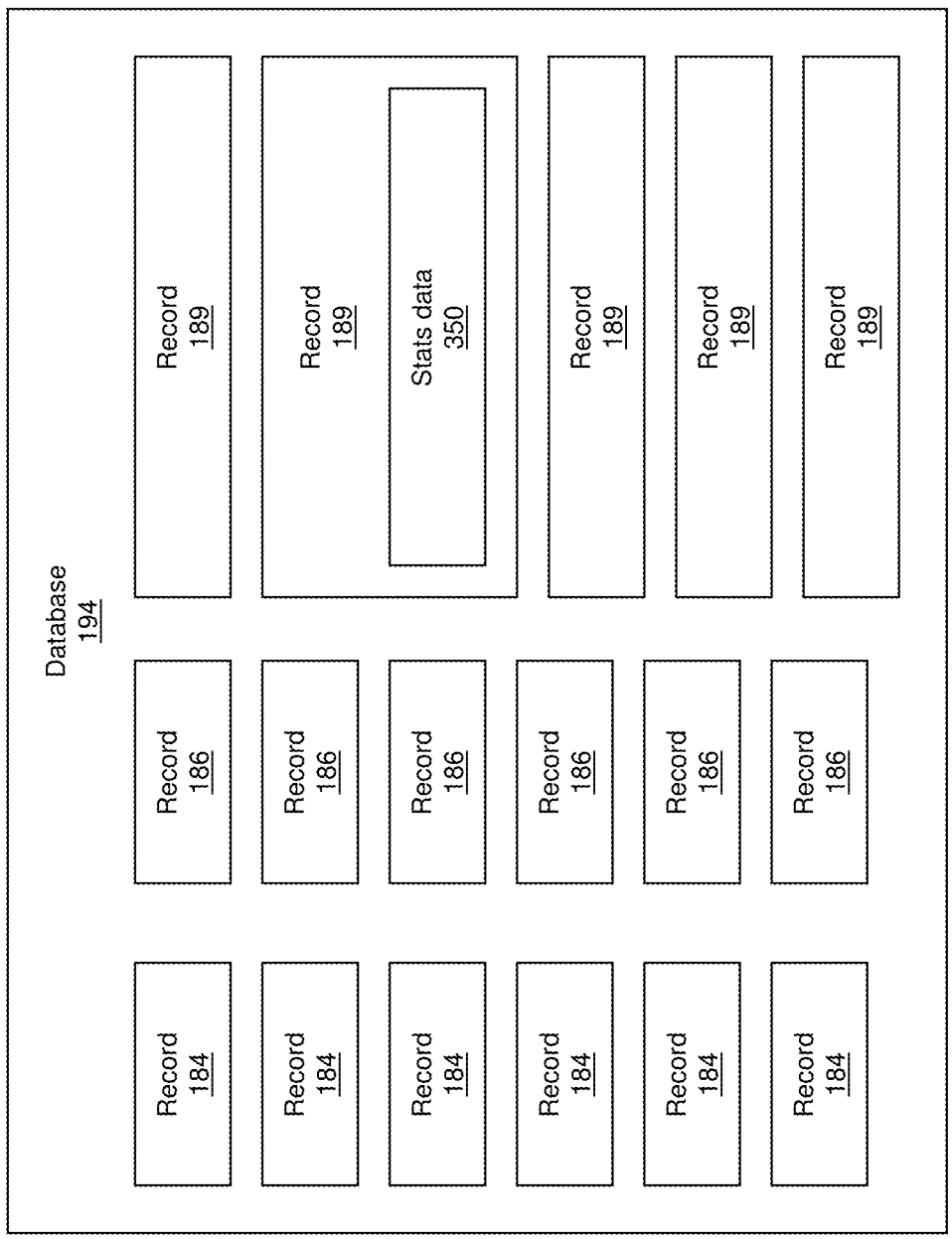
FIGS. 11 and 12 show an example of a variant in which factual information related to a sporting event is presented on a communication device in association with a highlight of the sporting event.

To that end, as shown in FIG. 11, the database 194 of the highlight transmission entity 190 may contain records 189 including data 350 regarding the stats related to the sporting events, which will be referred to as "stats data". In various examples, the stats data 350 contained in a record 189 may include stats of a player (e.g., a number of goals, touchdowns, runs, or other points scored, a number of games played, a field goal percentage, a pass completion percentage, a number of penalty minutes, etc.), stats of a team (e.g., a number of games won, a number of games lost, a winning percentage, a standing or rank, etc.), etc. The stats data 350 contained in the records 189 may be maintained and updated by accessing one or more repositories of sports stats, such as those maintained by professional sports associations (e.g., the NHL, the NFL, Major League Baseball (MLB), the National Basketball Association (NBA), the Fédération Internationale de Football Association (FIFA), etc.) which may be made available directly, via their website, or in any other suitable way, and/or those maintained by any other organization or individual (e.g., those maintained by sports teams).

Figure 12:
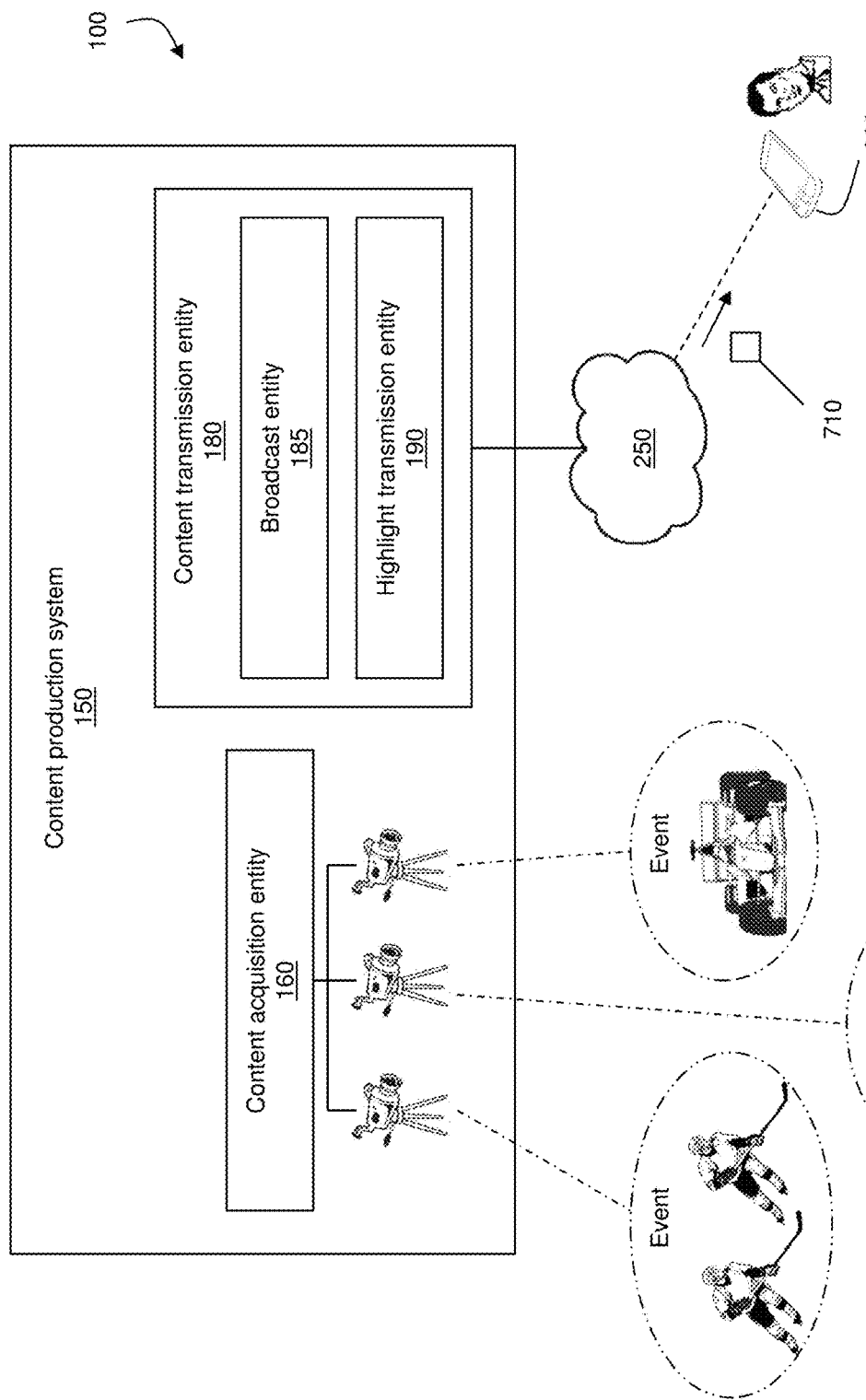

For instance, in the example considered above, as shown in FIG. 12, the highlight transmission entity 190 may transmit data 710 conveying stats related to Team ABC's goal, such as stats of a player who scored the goal and those of one or more players who may have assisted in scoring the goal, to the communication device 200. The data 710 may be conveyed together with the data 420, 460, 422, or 424 relating to Team ABC's goal in a common transmission or may be conveyed separately from the data 420, 460, 422, or 424 relating to Team ABC's goal in a separate transmission right after transmission of the data 420, 460, 422, or 424 relating to Team ABC's goal.

For example, the data 710 may be transmitted as a text message or email message that provides the stats related to Team ABC's goal. As another example, the data 710 may cause an app running on the communication device 200 to present the stats related to Team ABC's goal.

Upon receiving the data 710 conveying the stats related to Team ABC's goal, the communication device 200 processes the data 710 to show the stats related to Team ABC's goal to the user. Accordingly, in addition to viewing Team ABC's goal, the user can obtain the stats related to Team ABC's goal.

In embodiments in which the data 710 conveying the stats related to Team ABC's goal is transmitted to an app running on the communication device 200, the app may maintain a local stats database in memory of the communication device 200 that can be consulted by the user when desired. This may allow the user to consult the local stats database on the communication device 200 to conveniently check stats of players and/or teams of interest to the user at a time of his/her choice (e.g., without having to access a website or even without having Internet access).

In addition to or instead of stats related to the sporting events, in some embodiments, the factual information related to the sporting events that can be transmitted by the highlight transmission entity 190 to the communication device 200 may include other facts, such as news related to the sporting events, trivia related to the sporting events (e.g., trivia about players or teams involved in the highlights of the sporting events, etc.), and/or any other facts that may be of interest to the user of the communication device 200.

In some embodiments, in addition to being notified and/or viewing highlights of the sporting events, users of the communication devices 200 may have an option to communicate (e.g., "share") the highlights to one or more third parties (e.g., via an SMS, MMS, or email message; via a post on Facebook, Twitter or another social networking service; etc.).

Figure 13:
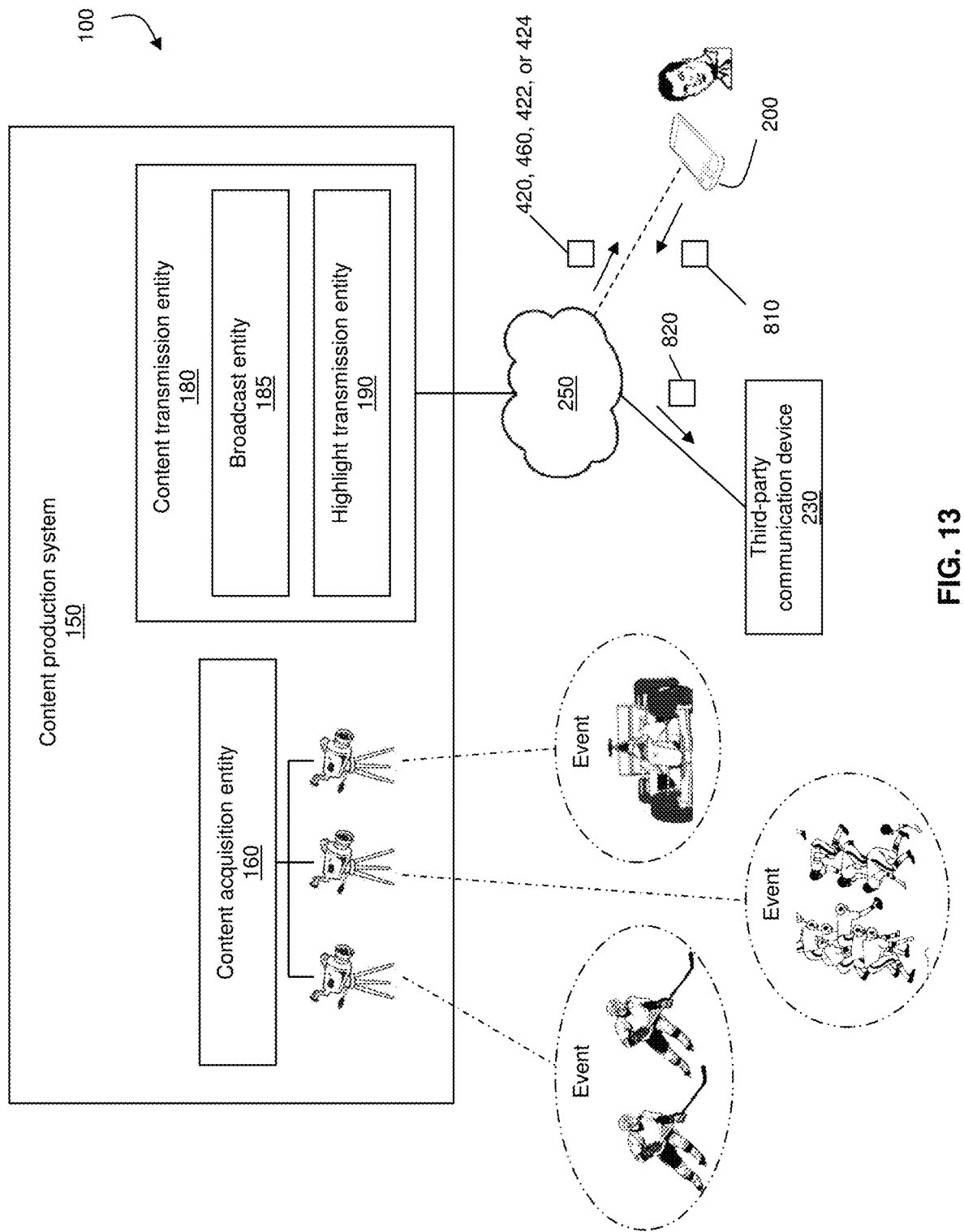
FIG. 13 shows an example of a variant in which a user of a communication device having been notified of and/or viewed a highlight of a sporting event desires to communicate the highlight of the sporting event to one or more third parties.

For instance, in the example considered above, as shown in FIG. 13, the communication device 200 may, upon receiving the data 420, 460, 422, or 424 relating to Team ABC's goal, provide an option for the user to communicate Team ABC's goal to one or more third parties by providing a hyperlink, button, or other graphical element actionable by the user to that end. Upon the user deciding to use this option by acting on the graphical element, the communication device 200 transmits data 810 to communicate Team ABC's goal to one or more third-party communication devices 230 (e.g., smartphones, tablets, servers, etc.). For instance, in some cases, the data 810 may be transmitted to the highlight transmission entity 190 as a request to transmit data 820 regarding Team ABC's goal to the one or more third-party communication devices 230. For example, the data 820 may be transmitted as a text message or email message destined for one or more recipients specified by the user and related to Team ABC's goal. As another example, the data 820 may be transmitted as a message destined for a server of a social networking service (e.g., Facebook, Twitter, etc.) subscribed to by the user to create a post related to Team ABC's goal in an account (e.g., a profile) of user within the social networking service. Information about an account of the user with the social networking service may be obtained, for instance, from an app of the social networking service running on the communication device 200 and/or may be included in the user information 302 in the record 184 of the database 194.

In some embodiments, the data 820 may convey the A/V content of Team ABC's goal (e.g., include a file (e.g., an MPEG file) that conveys the A/V content of Team ABC's goal and that is openable to view Team ABC's goal). An individual (e.g., a recipient of the text message or email message or a viewer of the post on the social networking service) may thus view Team ABC's goal on his/her communication device.

In other embodiments, the data 820 may not convey the A/V content of Team ABC's goal but may rather convey a notification of Team ABC's goal, which may include, for instance, a description of Team's ABC goal and/or a picture (e.g., a "thumbnail") in respect of Team ABC's goal. The notification may be actionable by an individual (e.g., a recipient of the text message or email message or a viewer of the post on the social networking service) viewing it on his/her communication device, for instance by clicking on a hyperlink, button or other graphical element of the notification, in order to view Team ABC's goal. Upon the individual acting on the notification, data conveying the A/V content of Team ABC's goal may be transmitted to the individual's communication device such that the individual can view Team ABC's goal. In some cases, presentation of Team ABC's goal on the individual's communication device may be done free of charge. In other embodiments, presentation of Team ABC's goal on the individual's communication device may involve a payment. For example, in some cases, the individual may be requested to provide payment information (e.g., a credit card number) to effect the payment. As another example, in cases where the individual is viewing the post on the social networking service, the payment may be effected through the social networking service. As yet another example, in some cases, when the individual acts on the notification to view Team ABC's goal, he/she may be redirected to a server to download app for the highlight transmission service from a repository (e.g., Apple's App Store, Google Play, etc.) onto the individual's communication device, which may then allow the individual to view Team ABC's goal.

As a possible alternative, in other embodiments, the data 810 may be transmitted by the communication device 200 to the one or more third-party communication devices 230 and convey data regarding Team ABC's goal (e.g., a notification of Team ABC's goal and/or the A/V content of Team ABC's goal, similar to that described above), without the highlight transmission entity 190 transmitting the data 820.

As yet another possible alternative, in other embodiments, the option for the user to communicate Team ABC's goal to one or more third parties may have been previously selected by the user before occurrence of Team ABC's goal. For instance, the user may have previously selected the option (e.g., in an app for the highlight transmission service running on the communication device 200) such that any highlight of a sporting event conveyed to the communication device 200 is automatically communicated to one or more third parties (e.g., via an SMS, MMS, or email message to one or more recipients specified by the user; via a post on the account of the user in the social networking service; etc.).

The highlight transmission entity 190 and a communication device 200 may operate to handle multiple events that may occur simultaneously or contemporaneously (e.g., two or more highlights occurring in different sporting events that are to be presented at the communication device 200; an incoming phone call while the communication device 200 shows a highlight of a sporting event; etc.). For example, in some embodiments, in a situation where two highlights in two different sporting events occur simultaneously or during a common period and are to be presented at the communication device 200, data regarding each highlight (e.g., data conveying A/V content presenting the highlight) is transmitted to the communication device 200 in sequence. A queue may be implemented by the communication device 200 to allow the user to view each highlight in a predetermined order or in an order of the user's choice. As another example, in some embodiments, in a situation where an incoming phone call comes in at the communication device 200 while the user is viewing a highlight of a sporting event on the communication device 200, presentation of the highlight by the communication device 200 may be paused to allow the user to take the phone call and then resumed once the phone call is over.

Figure 16:
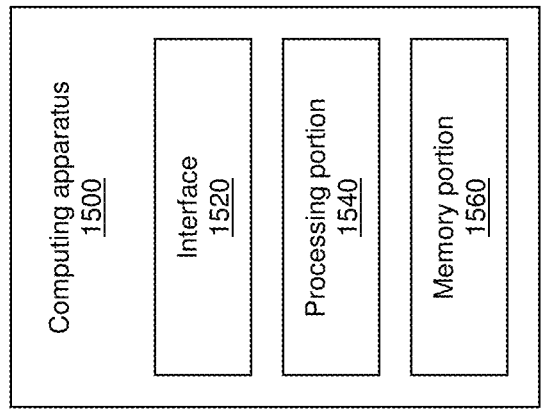
FIG. 16 shows an example of a computing apparatus which may be comprised by a component mentioned herein.

In some embodiments, as shown in FIG. 16, a given component mentioned herein (e.g., the highlight transmission entity 190 or any other component of the content production system 150; a communication device 200; etc.) may comprise a computing apparatus 1500 comprising suitable hardware and/or software configured to implement functionality of that given component. The computing apparatus 1500 comprises an interface 1520, a processing portion 1540, and a memory portion 1560.

The interface 1520 comprises one or more inputs and outputs allowing the computing apparatus 1500 to receive signals from and send signals to other components to which the computing apparatus 1500 is connected (i.e., directly or indirectly connected).

The processing portion 1540 comprises one or more processors for performing processing operations that implement functionality of the computing apparatus 1500. A processor of the processing portion 1540 may be a general-purpose processor executing program code stored in the memory portion 1560. Alternatively, a processor of the processing portion 1540 may be a specific-purpose processor comprising one or more preprogrammed hardware or firmware elements (e.g., application-specific integrated circuits (ASICs), electrically erasable programmable read-only memories (EEPROMs), etc.) or other related elements.

The memory portion 1560 comprises one or more memories for storing program code executed by the processing portion 1540 and/or data used during operation of the processing portion 1540. A memory of the memory portion 1560 may be a semiconductor medium (including, e.g., a solid-state memory), a magnetic storage medium, an optical storage medium, and/or any other suitable type of memory. A memory of the memory portion 1560 may be read-only memory (ROM) and/or random-access memory (RAM), for example.

The computing apparatus 1500 may be implemented in various other ways in other embodiments. For example, in other embodiments, the computing apparatus 1500 may be a quantum computing apparatus.

In some embodiments, two or more elements of the computing apparatus 1500 may be implemented by devices that are physically distinct from one another (e.g., located in a common site or in remote sites) and may be connected to one another via a bus (e.g., one or more electrical conductors or any other suitable bus) or via a communication link which may be wired, wireless, or both and which may traverse one or more networks (e.g., the Internet or any other computer network such as a local-area network (LAN) or wide-area network (WAN), a cellular network, etc.). In other embodiments, two or more elements of the computing apparatus of the vehicle 10 may be implemented by a single device.

Any feature of any embodiment discussed herein may be combined with any feature of any other embodiment discussed herein in some examples of implementation.

Certain additional elements that may be needed for operation of certain embodiments have not been described or illustrated as they are assumed to be within the purview of those of ordinary skill in the art. Moreover, certain embodiments may be free of, may lack and/or may function without one or more elements that are not specifically disclosed herein.

Although various embodiments and examples have been presented, this was for the purpose of describing, but not limiting, the invention. Various modifications and enhancements will become apparent to those of ordinary skill in the art and are within the scope of the invention.

The invention claimed is:

1. A computer-implemented method for allowing users of mobile communication devices to watch sporting events, the computer-implemented method comprising:
   processing data regarding the sporting events to determine that a given one of the users is to be notified of a highlight of a given one of the sporting events;
   conveying a notification regarding the highlight of the given one of the sporting events on the mobile communication device of the given one of the users during the given one of the sporting events;

after the notification regarding the highlight of the given one of the sporting events, receiving an indication of the given one of the users desiring to watch a prolonged portion of the given one of the sporting events that occurs after the highlight of the given one of the sporting events; and in response to the indication of the given one of the users desiring to watch the prolonged portion of the given one of the sporting events, conveying a media stream showing the prolonged portion of the given one of the sporting events on the mobile communication device of the given one of the users during the given one of the sporting events.

2. The computer-implemented method of claim 1, wherein the prolonged portion of the given one of the sporting events is a remainder of the given one of the sporting events.

3. The computer-implemented method of claim 1, wherein the notification regarding the highlight of the given one of the sporting events is actionable by the given one of the users to view the highlight of the given one of the sporting events on the mobile communication device of the given one of the users.

4. The computer-implemented method of claim 1, comprising: receiving an indication of the given one of the users desiring to view the highlight of the given one of the sporting events; and, in response to the indication of the given one of the users desiring to view the highlight of the given one of the sporting events, showing the highlight of the given one of the sporting events on the mobile communication device of the given one of the users.

5. The computer-implemented method of claim 1, comprising receiving input from the given one of the users indicative of at least one type of highlight that the given one of the users desires to be notified of via the mobile communication device of the given one of the users.

6. The computer-implemented method of claim 1, wherein the sporting events are in a plurality of different sports.

7. The computer-implemented method of claim 1, comprising charging a monetary amount to an account associated with the given one of the users for showing the prolonged portion of the given one of the sporting events.

8. The computer-implemented method of claim 1, comprising: presenting an option on the mobile communication device of the given one of the users for the given one of the users to share the highlight of the given one of the sporting events with a third party; and, in response to the user using the option to share the prolonged portion of the given one of the sporting events with the third party, transmitting data to communicate the highlight of the given one of the sporting events to the third party.

9. The computer-implemented method of claim 2, wherein said conveying the notification regarding the highlight of the given one of the sporting events is within two minutes from the highlight of the given one of the sporting events.

10. The computer-implemented method of claim 2, wherein said conveying the notification regarding the highlight of the given one of the sporting events is within one minute from the highlight of the given one of the sporting events.

11. The computer-implemented method of claim 2, comprising, upon the given one of the users acting on the notification regarding the highlight of the given one of the sporting events at the mobile communication device of the given one of the users, presenting an option on the mobile communication device of the given one of the users for the given one of the users to watch the prolonged portion of the given one of the sporting events, wherein the indication of the given one of the users desiring to watch the prolonged portion of the given one of the sporting events is received in response to the given one of the users using the option to watch the prolonged portion of the given one of the sporting events.

12. The computer-implemented method of claim 3, wherein the notification regarding the highlight of the given one of the sporting events includes a graphical element actionable by the given one of the users to view the highlight of the given one of the sporting events.

13. The computer-implemented method of claim 4, wherein the indication of the given one of the users desiring view the highlight of the given one of the sporting events is received before the indication of the given one of the users designing to watch the prolonged portion of the given one of the users is received.

14. The computer-implemented method of claim 4, wherein a duration of the highlight of the given one of the sporting events is no more than one minute.

15. The computer-implemented method of claim 5, wherein the at least one type of highlight is a plurality of different types of highlight.

16. The computer-implemented method of claim 5, wherein the at least one type of highlight is from a plurality of different sports.

17. The computer-implemented method of claim 5, wherein the at least one type of highlight includes a scoring play.

18. The computer-implemented method of claim 11, wherein the option to watch the prolonged portion of the given one of the sporting events comprises a graphical element displayed by an app on the mobile communication device of the given one of the users and actionable by the given one of the users to watch the prolonged portion of the given one of the sporting events.

19. A non-transitory computer-readable storage medium storing computer-readable instructions which, when executed by a computing apparatus, cause the computing apparatus to implement a method for allowing users of mobile communication devices to watch sporting events, the method comprising:

processing data regarding the sporting events to determine that a given one of the users is to be notified of a highlight of a given one of the sporting events;

conveying a notification regarding the highlight of the given one of the sporting events on the mobile communication device of the given one of the users during the given one of the sporting events;

after the notification regarding the highlight of the given one of the sporting events, receiving an indication of the given one of the users desiring to watch a prolonged portion of the given one of the sporting events that occurs after the highlight of the given one of the sporting events; and in response to the indication of the given one of the users desiring to watch the prolonged portion of the given one of the sporting events, conveying a media stream showing the prolonged portion of the given one of the sporting events on the mobile communication device of the given one of the users during the given one of the sporting events.

20. A computer-implemented method for allowing a user of a mobile communication device to watch a sporting event, the computer-implemented method comprising:

receiving a push notification regarding a highlight of the sporting event at the mobile communication device over a wireless network during the sporting event;

presenting an option on the mobile communication device for the user to watch a prolonged portion of the sporting event after the highlight of the sporting event; and in response to the user using the option, showing the prolonged portion of the sporting event on the mobile communication device.

\* \* \* \* \*